United States Patent Office.

MAURICE FITZGIBBONS, OF NEW YORK, N. Y.

*Letters Patent No.* 83,770, *dated November* 3, 1868; *reissue No.* 3,230, *dated December* 15, 1868.

IMPROVED MATERIAL FOR THE MANUFACTURE OF BOXES AND OTHER ARTICLES.

The Schedule referred to in these Letters Patent and making part of the same.

*To all whom it may concern:*

Be it known that I, MAURICE FITZGIBBONS, of the city, county, and State of New York, have invented a new and improved Mode of Making and Preparing a New Material for the Manufacture of Useful and Fancy Boxes and other Articles, said material consisting of a combination of wooden veneers and paper or woven fabrics.

The nature of the invention consists in forming a combination of the aforesaid materials in manner and form as follows, to wit: In gluing or otherwise fastening together wooden veneers with paper or woven fabrics, in one or more thicknesses, between the two laminæ of wood, always leaving the wooden veneers on the outside, thereby securing great strength, flexibility, and elasticity, and thus forming a new combination of materials, light, cheap, and peculiarly adapted to the manufacture of boxes and other useful and ornamental articles.

This invention consists, and what I claim as novel consists, in a material which is formed by gluing or otherwise fastening one or more sheets or laminæ of wooden veneers to each side of a sheet or sheets of paper or woven fabrics, always leaving the wood on the exterior.

By this peculiar combination, as aforesaid, a very strong and endurable material is formed, and when made of fancy veneers, is at once stronger and more ornamental than the most expensive fancy papers.

To enable others skilled in the art to make and use my invention, I will proceed to describe its construction and operation.

I construct my material by spreading the upper and under surfaces of two sheets or laminæ of wooden veneers with glue or other tenacious substance, and placing between them one or more thicknesses of paper, and then pressing the same together in a stationary plate or rolling-press, when the material is at once fit to use for the purposes proposed.

It will be obvious that, though paper is presented as preferred for the intermediate material, yet that any tenacious and flexible material will answer, as cloth, thin leather, India rubber, and gutta-percha.

Having thus described my invention,

What I claim as new, and desire to secure by Letters Patent, is—

A fabric composed of external laminæ of wood, and an intermediate flexible fabric, substantially as described.

M. FITZGIBBONS.

Witnesses:

ALBAN C. STIMERS,
EDW'D O'CONNOR.